Feb. 23, 1965
A. FIBISH
3,170,241
MEASURING APPARATUS
Filed Nov. 6, 1962
2 Sheets-Sheet 1
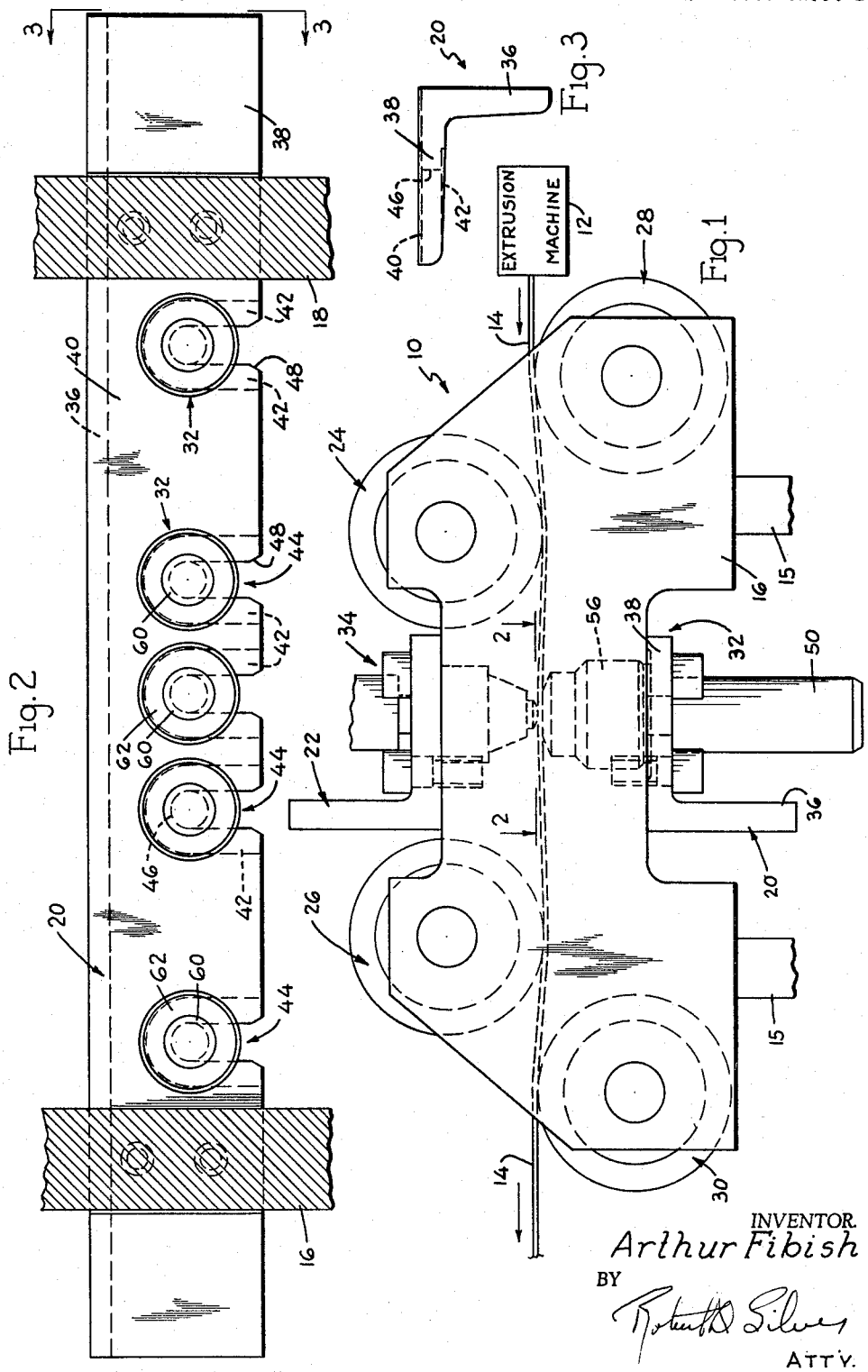
INVENTOR.
*Arthur Fibish*
BY
ATTY.

Feb. 23, 1965　　　　　　A. FIBISH　　　　　　3,170,241
MEASURING APPARATUS
Filed Nov. 6, 1962　　　　　　　　　　　　2 Sheets-Sheet 2
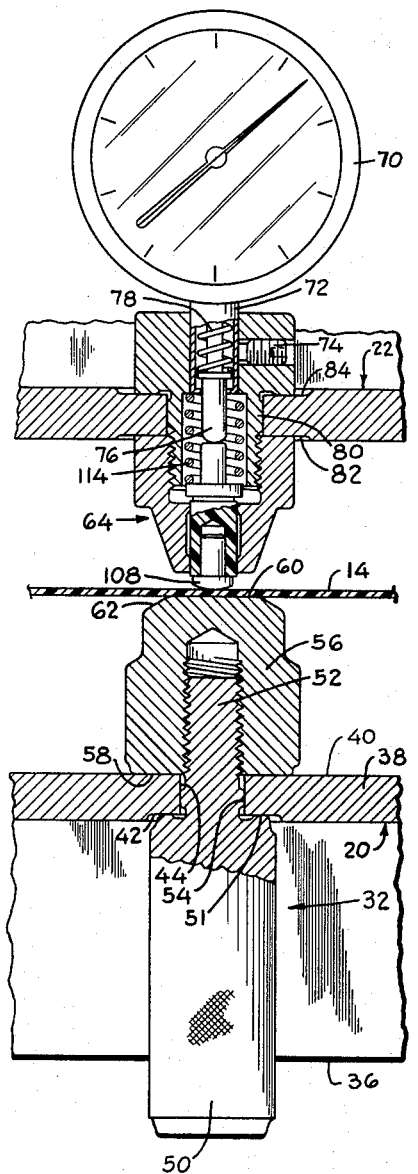
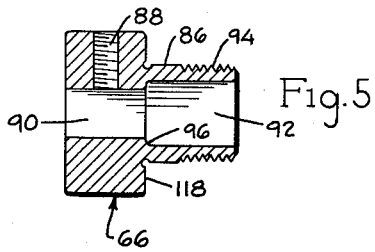
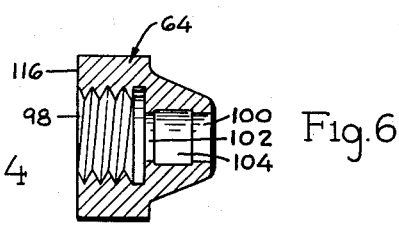
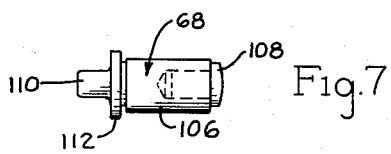
INVENTOR.
Arthur Fibish
BY
ATT'Y.

United States Patent Office 3,170,241
Patented Feb. 23, 1965

3,170,241
MEASURING APPARATUS
Arthur Fibish, Prospect Heights, Ill., assignor to Illinois Tool Works Inc., Chicago, Ill., a corporation of Delaware
Filed Nov. 6, 1962, Ser. No. 235,655
5 Claims. (Cl. 33—147)

This invention relates in general to apparatus for checking sheet material thickness and more particularly relates to economical, quick detachable apparatus for measuring the cross sectional thickness of material such as sheet plastics and the like.

Various devices have been proposed heretofore for constantly automatically measuring the sheet material thickness of a sheet having substantial width as it is being manufactured. Most of the devices proposed heretofore have been exceptionally elaborate and expensive, often costing in the tens of thousands of dollars. One major disability that accrues to these prior art devices, in addition to the great expense thereof, is that they are not easily removed from the area or dismantled upon changeover of the sheet material coming from a machine such as a plastic extruder or the like. Since plastic extrusion machines and the like are often stopped and started many times in one day, the problem of realigning and resetting the testing apparatus for giving a continual check of the thickness of the material in a plurality of places poses great difficulties.

The instant apparatus overcomes the prior art disabilities as shall be described. More particularly, it is a general object of this invention to provide a measuring apparatus which is economical, reliable, has few moving parts, and is otherwise well adapted for the purposes for which it was designed.

Still another object of this invention is to provide a checking apparatus having one portion thereof which is quickly detachable from association with the sheet material to be checked so that new material may be threaded through the device with a minimum of trouble.

Still another object of this invention is to provide an anvil means associated with an indicia means for measuring deviations in thickness of sheet material passing therebetween, said anvil means being instantaneously installable by relatively unskilled workmen while the sheet material is moving through the device.

A further object of this invention is to provide a checking apparatus as above mentioned wherein a group of rollers are so arranged relative to the sheet material passing thereby, such that the material is held in taut condition as it is traveling between the anvil means and the indicia means to thereby give consistency of readings on the indicia means.

It is a further object of this invention to provide an apparatus which may be used to spot check the cross sectional thickness of the material passing through or alternatively may be used with recorder means to supply a constant graph of the cross sectional thickness as suitable and desired.

The novel features that are characteristic of the invention are set forth with particularity in the appended claims. The invention itself, both as to its organization and its method of operation, together with additional objects and advantages thereof, will best be understood by the following description of a specific embodiment when read in connection with the accompanying drawings in which:

FIG. 1 is a partial side elevational view of the checking apparatus;

FIG. 2 is a view along line 2—2 of FIG. 1 with the sheet material removed;

FIG. 3 is a view along line 3—3 of FIG. 2 when the transverse member is in detached relationship to the upright members;

FIG. 4 is a sectional view through the measuring indicia means and the anvil means in operative relation to the sheet material;

FIG. 5 is a sectional view through one of the parts of the measuring indicia means, said part being shown in detached relation;

FIG. 6 is a sectional view through another part of the indicia means, said part being shown in detached relation; and FIG. 7 is a view of still another part of the measuring indicia means, said part being shown in detached relation.

The measuring apparatus 10 is adapted to be associated with an extrusion machine 12, shown semidiagrammatically on the right hand portion of FIG. 1. The machine 12 is operable to extrude sheet material such as sheet plastic having a substantial width and relatively small thickness. In forming sheet plastic material, it is often necessary to maintain the thickness dimensions within very close tolerances since the sheet material is often used as a starting material for further forming operations to provide articles of manufacture such as containers or the like. Since the material being extruded from the machine 12 may have various thickness requirements, and since different types of materials are often extruded from the same machine at different times, the measuring apparatus for measuring the thickness of the material being processed through the machine is preferably of a nature such that it may be quickly removed from the area. This obtains because the first or starting end of a new batch of extruded material is scrap while the machine is being adjusted to its running rate, said scrap varying considerably in thickness and also being difficult to thread through fixed measuring apparatus.

The instant invention solves the problem by having a quick removable anvil means which, by a simple twist of the knob, removes one-half of the measuring apparatus from contact with the sheet material allowing plenty of room for maneuverability of scrap material past the station where the material is to be measured. Also the measuring portion of the apparatus may be quickly removed although this is generally not necessary.

More particularly, the measuring station comprises a pair of upright side support members 16 and 18 mounted to a frame 15 in association with the extrusion machine, said side members being shown in side elevation in FIG. 1. A pair of relatively heavy gauge channel-shaped transverse support members 20 and 22 extend across the path of movement of the sheet material 14 and are fixedly attached in spaced relation to each other to the side supports 16 and 18 on opposite sides of the sheet 14. Spaced upper roller members 24 and 26 are journalled into the side support members 16 and 18 on either side of the upper transverse support member 22 for engaging the sheet material 14. Two lower roller members 28 and 30 are spaced outboard of the two upper roller members 24 and 26 and are similarly journalled into the side support members with the top circumferential edges thereof extending slightly above the lowest extent of the circumferential edges of rollers 24 and 26. Thus, as the sheet material 14 passes thereby, an ironing effect takes place causing the sheet material 14 to be in a substantially taut condition as it passes between transverse support members 20 and 22.

A quick detachable anvil means 32 is mounted on the lower transverse support member 20 and measuring and indicia means 34 is mounted to the upper support means 22. As perhaps best perceived in FIGS. 2 and 3, the lower support means 20 is in the form of a channel-shaped, elongated metallic member having angularly disposed arms 36 and 38. Arm 38 is disposed so that the major plane thereof is substantially parallel to the path of movement of the sheet material 14, and the top surface thereof, at 40, for a major portion of the length of the member 20, is milled or ground to a high precision flat surface. A plurality of surfaces 42 are milled or ground on the underside of arm 38 (as viewed in FIGS. 2 and 3), said flat surfaces 42 each being carefully maintained parallel to surface 40.

A plurality of slot means 44, opening onto a side edge of arm 38, are formed in a manner to provide quick detachable accurate mounting of the anvil means 32. The side edges of the slot means 44 and the curvilinear portion 46 at the end thereof are carefully maintained at the precise dimension of shoulder 54 of handle member 50 of the anvil means 32 as shall be explained. The side edges of the slot means 44 are maintained exactly transverse to surfaces 40 and 42 and preferably are chamfered at the entering end 48 to facilitate ease of entry of the anvil means. The curvilinear end 46 of the slot means 44 serves as a stop shoulder for locating shoulder 54 of the anvil means.

The quick detachable anvil means 32 comprises a handle clamping member 50 having a knurled lower surface and a necked down threaded upper portion 52. An upwardly facing locating shoulder 51 circumferentially surrounds the necked down extension and a locating shoulder 54 is disposed on the necked down portion 52 below the threads as best shown in FIG. 4. The upper member 56 of the quick detachable anvil means has a threaded bore for cooperation with the necked down portion 52 and a precise flat surface 58 for cooperating with surface 40 of arm 38 of the transverse support member. The upper end of member 56 has a flat surface 60 centrally located thereon, said surface 60 being parallel to surface 58, the stock being removed around the side edges of surface 60 to provide a tapered surface 62 which will not present a sharp corner for impingement upon the underside of the plastic sheet 14.

It will be appreciated that the anvil means 32 may be quickly detached and reinserted into engagement with arm 38 of support 20 by merely hand loosening the knurled handle portion 50 and retightening of same. Due to the geometry involved and the relatively large size of surface 58 engaging surface 40, surface 60 will always be located the same distance above arm 38 when reinstated in the slot. By bottoming shoulder 54 on curvilinear slot surface 46, precise reorientation of the anvil means, after it has been detached, is quickly and easily accomplished. Due to the relatively larger diameter of surface 60 relative to surface 108 on the indicia means, very minute misalignments of the anvil means, from a concentricity standpoint relative to the indicia means 34 (on the order of a few ten-thousandths of an inch) do not affect the accuracy of the measurement.

The measuring and indicia means 34 essentially comprises a pair of clamping members 64 and 66 which are mounted to the upper transverse support means 22 concentric with the anvil means 32 to present spring loaded member 68 in engagement with the plastic sheet 14. Transverse support means 22 may have milled or ground parallel flat opposing surfaces 82 and 84 in the area of an aperture 80 which receives shoulder 86 of the upper clamping member 66. The aperture 80 may be a slot similar to slot 44 or it may be a bore since in usual operation of the apparatus, it is not necessary to remove both the anvil means and the measuring and indicia means. For accuracy of measurement, the flat portions 82 and 84 of arm 22 are preferably disposed exactly parallel to flat surfaces 40 and 42 of the lower support member 20. Also the aperture has side walls which are preferably disposed exactly parallel with the side walls of the slot 44 and exactly transverse to surfaces 82 and 84.

A dial 70 is fixedly mounted to the upper clamping member 66 by a tube 72, it being appreciated that instead of a dial 70, a continuous recording mechanism for a graph may be substituted if a continuous check is believed necessary or desirable. The tube 72 is fixed to the upper member 66 by a set screw 74 and has a lightly spring loaded follower 76 centrally thereof biased by spring 78 into engagement with the sheet engaging member 68. It will be appreciated that the spring 78 is very light as compared to spring 114 and merely gives a following action. Any of a number of a plurality of commercially available dial means 70 responsive to movement of the member 68 may be employed, as long as it is adapted to have a portion similar to portion 76 engageable with end 110 of member 68.

The upper clamping member 66 (as shown in FIGS. 4 and 5) is formed with a bore 90 and the counterbore 92, the latter being interiorly disposed to a necked down portion which is threaded at the end 94 outboard (as viewed in FIG. 5) of the locating shoulder 86. A crossbore 88 interconnects with bore 90 for receiving the screw 74 for mounting the neck 72 of the dial 70. Surface 118 radially outwardly and transverse to shoulder 86 is adapted to engage surface 84 of arm 22 which together with the location of shoulder 86 on the slot means or aperture means 80 provides precise location of the upper member. The lower member 64 has a threaded counterbore 98 for receiving the threaded portion 94 of member 66 and a bore 100–102 having a relieved portion 104 intermediate the surfaces thereof so as to provide precise axial alignment of member 68 which is slidably mounted therein. Surface 116 is disposed transverse to the axis of bore portions 100–102 and is disposed adjacent to milled surface 82 as shown in FIG. 4. Member 68 is preferably made of plastic and has a hardened insert 108 at the end thereof for engaging the top surface of the sheet material 14. A radially extended shoulder 112 separates the necked down portion 110 from portion 106, the latter being adapted to slide on portions 100–102 of member 64. The necked down portion 110 centers biasing spring 114, which engages shoulder 112, biasing member 68 downwardly as shown in FIG. 4. The other end of the biasing spring 114 engages shoulder 96 of member 66 to provide a constant downward bias on end portion 108. It will be appreciated that the depth of threaded portion 98 of member 64 is sufficient so that the shoulder defined between portion 98 and portion 102 of member 64 will not be engaged by shoulder 112 of member 68 when sheet material is passing between portion 108 and portion 60 as shown in FIG. 4.

As will be appreciated, variations of the thickness of the sheet material passing between surface 60 and portion 108 will be measured on the dial.

Although a specific embodiment of the invention has been shown and described, it is with full awareness that many modifications thereof are possible. The invention, therefore, is not to be restricted except in so far as is necessitated by the prior art and by the spirit of the appended claims.

I claim:
1. Apparatus for continuously measuring the thickness of sheet material passing thereby comprising first and second upright support means disposed in spaced parallel relation, first and second transverse support means mounted on said upright support means in spaced parallel relation adapted to have the sheet material pass therebetween, roller means mounted between said upright support means for presenting said sheet material in a substantially taut condition, quick detachable anvil means detachably mounted to said first transverse support means having a portion adapted to engage one side of the sheet material to be measured, said first transverse support means having first and second opposed parallel flat surfaces and slot means opening to a side edge of said first transverse support means and disposed substantially trans- verse to said first and second parallel flat surfaces, said quick detachable anvil means comprising first and second threadably engageable members each having a surface for respectively engaging said first and second flat surfaces of said transverse support means and one of said members having a portion insertable into said slot means for engagement with the side walls thereof to accurately locate said anvil means relative thereto in a quick detachable manner, and means including indicia means responsive to the thickness of and directly engageable with the other side of said sheet material to be measured being mounted on said second transverse support means in alignment with said anvil means whereby variations in thickness of the material passing between said indicia means and said anvil means will be indicated by said indicia means.

2. Apparatus for continuously measuring the thickness of sheet material passing thereby comprising first and second upright support means disposed in spaced parallel relation, first and second transverse support means mounted on said upright support means in spaced parallel relation adapted to have the sheet material pass therebetween, roller means mounted between said upright support means for presenting said sheet material in a substantially taut condition, quick detachable anvil means detachably mounted to said first transverse support means having a portion adapted to engage one side of the sheet material to be measured, and means including indicia means responsive to the thickness of and directly engageable with the other side of said sheet material to be measured being mounted on said second transverse support means in alignment with said anvil means whereby variations in thickness of the material passing between said indicia means and said anvil means will be indicated by said indicia means, said indicia means comprising first and second clampng members each having a central bore and a counterbore in coaxial alignment, said first and second members being clampingly engageable to said second transverse support means, a sheet material engaging member disposed in the bore of said first clamping member and biased toward engagement with said sheet material, means disposed in said bore of said second clamping member coaxial with said means for engaging said sheet material responsive to movement of the latter for continuously indicating movement responsive to the thickness of the sheet material engaged by said means in engagement with said sheet material.

3. The apparatus set forth in claim 1 wherein there are a plurality of cooperating quick detachable anvil means and indicia means mounted respectively on said first and second transverse support means.

4. The apparatus set forth in claim 1 wherein said first member of said anvil means comprises a knurled handle means having a necked down portion insertable into said slot means having a locating shoulder for engagement of the side walls of said slot means, and said second member of said anvil means having a surface spaced from said surface engaging said second surface of said transverse support means and disposed parallel thereto for engaging one side of said sheet material to be measured.

5. The apparatus set forth in claim 1 wherein each pair of roller means is disposed in horizontal and vertical offset relation with the peripheries thereof disposed in an intersecting horizontal plane.

References Cited by the Examiner

UNITED STATES PATENTS

| | | | |
|---|---|---|---|
| 1,963,310 | 6/34 | Nichols. | |
| 2,051,636 | 8/36 | Gastrich | 33—147 |
| 2,134,184 | 10/38 | Guyer | 33—147 |
| 2,325,170 | 7/43 | Bauer | 33—172 |
| 2,352,571 | 6/44 | Sprigg | 33—147 |
| 2,592,840 | 4/52 | Bauer | 33—172 |

FOREIGN PATENTS

| | | |
|---|---|---|
| 396,817 | 6/24 | Germany. |
| 959,682 | 2/57 | Germany. |
| 134,409 | 1/52 | Sweden. |

ISAAC LISANN, *Primary Examiner.*